United States Patent
Novikov et al.

(10) Patent No.: US 10,657,649 B2
(45) Date of Patent: May 19, 2020

(54) METHOD, APPARATUS AND SYSTEM FOR ANALYZING MEDICAL IMAGES OF BLOOD VESSELS

(71) Applicants: AGFA HEALTHCARE, Vienna (AT); VRVIS ZENTRUM FÜR VIRTUAL REALITY UND VISUALISIERUNG, Vienna (AT)

(72) Inventors: Alexey Novikov, Mortsel (BE); David Major, Mortsel (BE); Maria Wimmer, Mortsel (BE); Katja Buehler, Mortsel (BE)

(73) Assignees: AGFA HEALTHCARE, Vienna (AT); VRVIS ZENTRUM FUR VIRTUAL REALITY UND VISUALISIERUNG, Vienna (AT)

(*) Notice: Subject to any disclaimer, the term of this patent is extended or adjusted under 35 U.S.C. 154(b) by 148 days.

(21) Appl. No.: 15/758,351

(22) PCT Filed: Sep. 8, 2016

(86) PCT No.: PCT/EP2016/071134
§ 371 (c)(1),
(2) Date: Mar. 8, 2018

(87) PCT Pub. No.: WO2017/042249
PCT Pub. Date: Mar. 16, 2017

(65) Prior Publication Data
US 2018/0247414 A1 Aug. 30, 2018

(30) Foreign Application Priority Data
Sep. 10, 2015 (EP) .................................. 15184638

(51) Int. Cl.
*G06K 9/00* (2006.01)
*G06T 7/12* (2017.01)
(Continued)

(52) U.S. Cl.
CPC .............. *G06T 7/12* (2017.01); *G06K 9/6276* (2013.01); *G06T 7/11* (2017.01); *G06T 7/143* (2017.01);
(Continued)

(58) Field of Classification Search
None
See application file for complete search history.

(56) References Cited

U.S. PATENT DOCUMENTS

| 2004/0101179 A1* | 5/2004 | Suryanarayanan ... G06T 7/0012 382/128 |
| 2004/0101183 A1 | 5/2004 | Mullick et al. |

(Continued)

FOREIGN PATENT DOCUMENTS

EP    2 811 458 A1    12/2014

OTHER PUBLICATIONS

Official Communication issued in International Patent Application No. PCT/EP2016/071134, dated Nov. 29, 2016.
(Continued)

*Primary Examiner* — Shervin K Nakhjavan
(74) *Attorney, Agent, or Firm* — Keating & Bennett, LLP

(57) ABSTRACT

A method, and an according apparatus and system, for analyzing medical images of blood vessels includes the steps of a) classifying a surrounding of at least one vessel represented in at least one medical image by applying a first classifier to the medical image such that the surrounding of the vessel is assigned to one of at least two surrounding classes, and b) segmentation of the at least one vessel dependent on the surrounding class to which the surrounding of the vessel has been assigned. The invention allows for a reliable segmentation and/or shape detection, in particular bifurcation detection, of blood vessels represented in medical images.

17 Claims, 3 Drawing Sheets

(51) Int. Cl.
   *G06T 7/155* (2017.01)
   *G06T 7/143* (2017.01)
   *G06T 7/11* (2017.01)
   *G06K 9/62* (2006.01)

(52) U.S. Cl.
   CPC .... *G06T 7/155* (2017.01); *G06T 2207/10081* (2013.01); *G06T 2207/20012* (2013.01); *G06T 2207/20076* (2013.01); *G06T 2207/20081* (2013.01); *G06T 2207/20116* (2013.01); *G06T 2207/30101* (2013.01)

(56) References Cited

U.S. PATENT DOCUMENTS

| | | | |
|---|---|---|---|
| 2005/0195189 A1 | 9/2005 | Raman et al. | |
| 2010/0034446 A1* | 2/2010 | Zhu | G06K 9/38 382/130 |
| 2010/0128954 A1 | 5/2010 | Ostrovsky-Berman et al. | |
| 2012/0243757 A1* | 9/2012 | Funka-Lea | G06T 7/0002 382/131 |
| 2014/0210821 A1* | 7/2014 | Kapoor | G06T 15/08 345/424 |
| 2015/0043774 A1 | 2/2015 | Harder et al. | |
| 2016/0180525 A1* | 6/2016 | Reynolds | G06T 7/11 382/131 |
| 2016/0328855 A1* | 11/2016 | Lay | G06T 5/005 |

OTHER PUBLICATIONS

Lugauer et al., "Improving Accuracy in Coronary Lumen Segmentation via Explicit Calcium Exclusion, Learning-based Ray Detection and Surface Optimization", Progress in Biomedical Optics and Imaging, Spie—International society for Optical Engineering, vol. 9034, XP060031806, Mar. 21, 2014, 10 pages.

Marquez-Neila et al., "A Morphological Approach to Curvature-Based Evolution of Curves and Surfaces", IEEE Transactions on Pattern Analysis and Machine Intelligence, IEEE Computer Society, vol. 36, No. 1, XP011532081, Jan. 1, 2014, pp. 2-17.

Yang et al., "A Survey of Shape Feature Extraction Techniques" Pattern Recognition, In-Tech, XP055154010, Jan. 1, 2008, 39 pages.

\* cited by examiner

METHOD, APPARATUS AND SYSTEM FOR ANALYZING MEDICAL IMAGES OF BLOOD VESSELS

CROSS REFERENCE TO RELATED APPLICATIONS

This application is a 371 National Stage Application of PCT/EP2016/071134, filed Sep. 8, 2016. This application claims the benefit of European Application No. 15184638.3, filed Sep. 10, 2015, which is incorporated by reference herein in its entirety.

BACKGROUND OF THE INVENTION

1. Field of the Invention

The present invention relates to a method and a corresponding apparatus and system for analyzing medical images of blood vessels.

2. Description of the Related Art

Vascular diseases such as atherosclerosis and stenosis often affect human vessels and can lead to serious problems, including heart attack, stroke, or even death. To timely diagnose and treat such diseases, medical imaging techniques are widely used with Computed Tomography Angiography (CTA) being particularly suitable for producing detailed images of blood vessels and tissues in various parts of the body.

Image processing and machine learning techniques can help to accelerate and facilitate daily routines of physicians. Robust segmentation and labeling of vessels is important for accurate calcification, plaque and lumen segmentation. Consequently, this can help to better identify symptoms and diagnose many dangerous vascular diseases. To represent the complete vessel tree morphometry, in addition to precise vessel segmentation a detection of vessel landmarks such as bifurcations is required. A vessel bifurcation is the point at which a division of the vessel into two smaller vessels occurs. An accurate algorithm for bifurcation detection could be of use for post-processing of existing tracked vessels, correcting of regressed bifurcation landmarks or be a part of a larger vessel tracking or vessel labeling system.

SUMMARY OF THE INVENTION

Preferred embodiments of the invention provide a method, apparatus and system for analyzing medical images of blood vessels allowing for a reliable segmentation and/or shape detection, in particular bifurcation detection, of blood vessels represented in the images.

A method for analyzing medical images of blood vessels according to an aspect of the invention comprises the following steps: classifying a surrounding of at least one vessel represented in at least one medical image by applying a first classifier to the medical image, whereby the surrounding of the vessel is assigned to one of at least two surrounding classes, and segmentation of the at least one vessel dependent on the surrounding class to which the surrounding of the vessel has been assigned.

An apparatus for analyzing medical images of blood vessels according to another aspect of the invention comprises an image processing unit which is configured to classify a surrounding of at least one vessel represented in at least one medical image by applying a first classifier to the medical image, whereby the surrounding of the vessel is assigned to one of at least two surrounding classes, and to perform a segmentation of the at least one vessel dependent on the surrounding class to which the surrounding of the vessel has been assigned.

A system for analyzing medical images of blood vessels according to yet another aspect of the invention comprises a medical imaging apparatus configured to acquire medical images of blood vessels and an apparatus according to an aspect of the invention.

Aspects of the invention are based on the approach to provide a method for automated, in particular fully automated, blood vessel segmentation and/or detection, in particular blood vessel bifurcation segmentation and/or detection, wherein a vessel surrounding represented in the image is classified first, followed by a segmentation of the vessel represented in the image. The segmentation method used for vessel segmentation depends on the result of the classification of the vessel surrounding. For example, if a surrounding of a vessel is assigned to a first surrounding class, a first segmentation method is applied, and if the surrounding of the vessel is assigned to a second surrounding class, a second segmentation method is applied which is different to the first segmentation method. In the sense of present invention, the term "surrounding" with reference to a vessel preferably relates to any region around the vessel and/or in proximity of the vessel. The classification is performed by applying a first classifier to the image. Preferably, the first classifier is trained on a set of labeled images. By applying image segmentation based on the surrounding class to which the surrounding of the vessel represented in the image has been assigned, a reliable and accurate segmentation and/or detection of the blood vessel, in particular of a bifurcation of the blood vessel, in the image is achieved.

In summary, the invention allows for a reliable segmentation and/or shape detection, in particular bifurcation detection, of blood vessels represented in medical images.

Preferably, the at least two surrounding classes are different in terms of a concentration of bone structures being present close to and/or in proximity of the vessel. This aspect is based on the notion that vessels are often located close to bones and the intensities of vessels and bones represented in images are usually quite similar so that edges between vessels and bones are blurred. By applying different segmentation methods to images showing different kinds of vessel surroundings in terms of the presence of bone structures close to the vessel, for each kind of vessel surrounding represented in an image the most appropriate segmentation method can be applied to the image. As a result, a particularly reliable segmentation of the blood vessels is achieved.

It is, moreover, preferred that the at least two surrounding classes comprise a first surrounding class and a second surrounding class, wherein the concentration of bone structures being present in proximity of the vessel in the first surrounding class is higher than the concentration of bone structures being present in proximity of the vessel in the second surrounding class. By providing only two surrounding classes the classification of the vessel surrounding remains simple and is highly efficient with respect to the selection of one out of two different segmentation methods in order to achieve reliable blood vessel segmentation.

It is preferred that, if the surrounding of the vessel represented in the image is assigned to the first surrounding class, the segmentation of the vessel comprises applying a learning-based ray casting algorithm to the image. By using the learning-based ray casting algorithm for the segmentation of vessels which are in the proximity of and/or close to bone structures, a particularly reliable segmentation is achieved.

Alternatively or additionally, it is preferred that, if the surrounding of the vessel represented in the image is assigned to the second surrounding class, the segmentation of the vessel comprises applying an algorithm based on a morphological active contour without edges (MACWE) to the image. By using MACWE for the segmentation of vessels which are not in the proximity of and/or not close to bone structures, a particularly reliable segmentation is achieved.

According to another preferred embodiment, the first classifier is obtained by training a classifier with feature vectors for the at least two surrounding classes. Preferably, each feature vector is an eight-dimensional feature vector the components of which are obtained by calculating intensity differences of eight sub-patches of an image patch from a mean intensity of a reference sub-patch of the image patch. Preferably, the reference sub-patch is in the center of the image patch that is subdivided into nine sub-patches. By one or more of the aforementioned embodiments a particularly reliable distinction between two different classes of vessel surroundings is achieved in a simple way.

Preferably, the first classifier is a k-nearest neighbor (KNN) classifier which is configured to assign the surrounding of the vessel represented in an image to the surrounding class most common among its k nearest neighbors, wherein k is a positive integer. Preferably, in a training phase the KD-Tree for the KNN classifier is built on the basis of training images with feature vectors for the two surrounding classes, namely a normal case without bones located next to the vessel, also referred to as "second surrounding class", and a case where the vessel is located next to bones, also referred to as "first surrounding class". In a classification phase for each new image sample the KNN classifier is used to decide to which class this image sample more probably belongs to. Using a KNN classifier is a simple and yet reliable approach for determining the appropriate segmentation method.

According to yet another preferred embodiment, the method further comprises the step of classifying a shape of at least one section of a segmented vessel wall of the vessel by applying a second classifier to the segmented vessel wall, whereby the at least one section of the segmented vessel wall is assigned to one of at least two shape classes. Preferably, the least two shape classes comprise a first shape class relating to a vessel shape exhibiting a bifurcation. By this means, a "cascade classification" is performed in order to detect the shape, in particular bifurcation(s), of vessels, wherein the first and second classifier are trained for two separate classification steps, namely the first classifier is trained to differentiate a vessel surrounding represented in an image into different concentrations of bone structures next to the vessel (as explained in detail above), and the second classifier is trained to differentiate the segmented object (vessel) into different shapes, in particular bifurcations.

It is, moreover, preferred that the second classifier is obtained by training a classifier with one or more boundary descriptors for the at least two shape classes. Boundary descriptors contain descriptions of boundary characteristics of the segmented vessel represented in the image. Preferably, to compute the boundary descriptors the segmentation is outlined first by using morphological operators (dilation followed by subtraction) and then the minimum-bounding rectangle is fitted to the outline of the segmentation. Preferably, the one or more boundary descriptors relate to at least one of the following features of a segmented vessel wall: an elongation, an eccentricity, a convexity, a solidity, a standard deviation of radial distances. By means of one or more of the aforementioned embodiments particularly reliable shape detection, in particular bifurcation detection, of segmented vessels is achieved.

According to yet another preferred embodiment, the second classifier is based on an approximate nearest neighbor (ANN) algorithm and/or a support vector machine (SVM) algorithm.

Further advantages, features and examples of the present invention will be apparent from the following description of following figures.

DETAILED DESCRIPTION OF THE PREFERRED EMBODIMENTS

Figure 1:
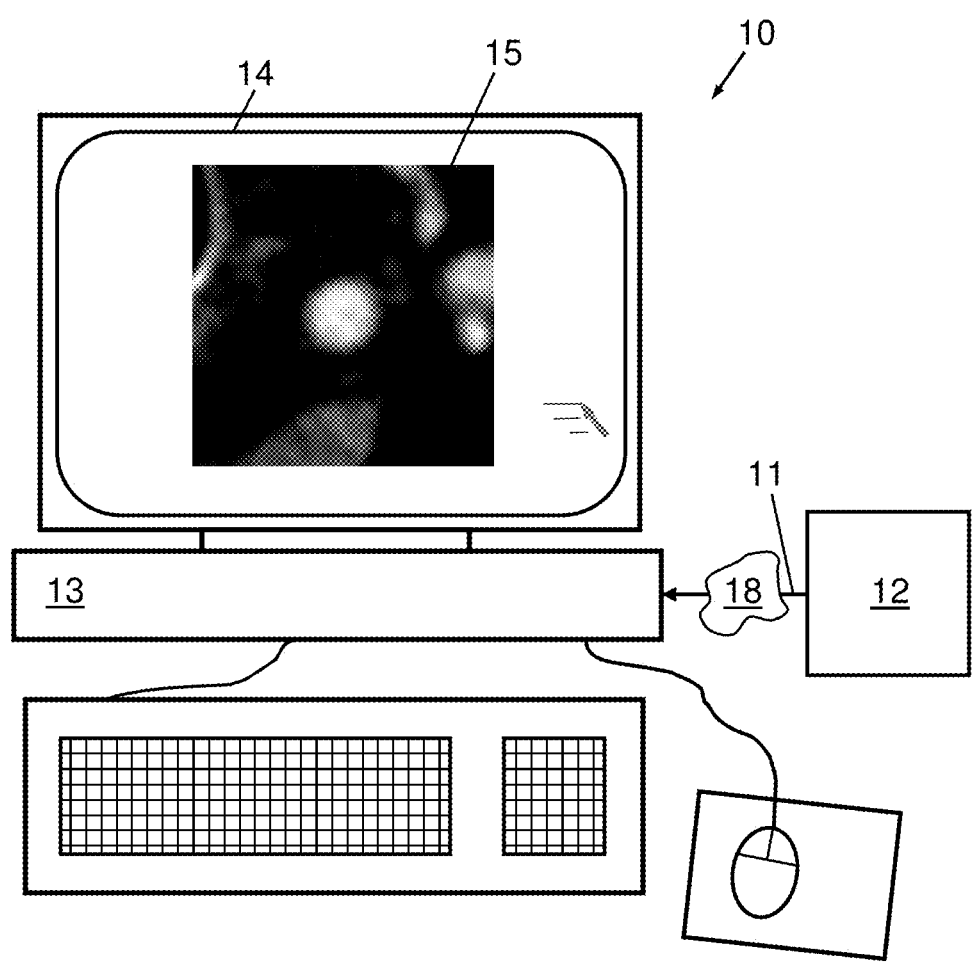
FIG. 1 shows an example of an apparatus and a system according to an embodiment of the invention.

FIG. 1 shows an example of an apparatus 10 and a system according to an embodiment of the invention. The system comprises a medical imaging apparatus 12, in particular a computed tomography (CT) or magnetic resonance (MR) imaging apparatus, which is configured to acquire one or more images, e.g. a plurality of two-dimensional images or a three-dimensional image, of a human or animal body and to generate a corresponding medical image data set 11. Preferably, the medical imaging apparatus 12 is configured to acquire and/or generate computed tomography angiography (CTA) or magnetic resonance angiography (MRA) images.

The apparatus 10 comprises an image processing unit 13, e.g. a workstation or a personal computer (PC), which is configured to process the image data set 11. Preferably, the image data set 11 is transferred from the medical imaging apparatus 12 to the image processing unit 13 via a data network 18, e.g. a local area network (LAN) or wireless LAN (WLAN) in a hospital environment or the internet.

The image processing unit 13 is preferably configured to generate a volume reconstruction and/or a slice image 15 of the image data set 11 on a display 14, e.g. a TFT screen of the workstation or PC, respectively.

The image processing unit 13 is further configured to perform image processing according to aspects of the present invention. Preferably, the image processing unit 13 is configured to classify a surrounding of at least one vessel represented in at least one medical image 15 by applying a first classifier to the medical image 15, whereby the surrounding of the vessel is assigned to one of at least two surrounding classes, and to perform a segmentation of the at least one vessel dependent on the surrounding class to which the surrounding of the vessel has been assigned.

This will be elucidated by means of examples of methods and/or algorithms in the following.

I. First Example

In a first example, it is assumed that a point within the vessel outer wall and a tangential vector to the vessel at the point are given. Preferably, the point is located inside the vessel lumen in order to achieve a particular reliable run of the algorithm. Preferably, the algorithm comprises the following steps:

1. An image patch with the center located at the given point is extracted using trilinear interpolation. Preferably, the image patch size is large enough to fit any possible human artery cross-section.

2. Contrast stretching of the data is performed in order to enhance the important bright structures at the patch and darken noise and other inessential structures. Depending on whether or not bone structures are present in the patch, the inside of the vessel is either darkened or enhanced.

3. K-Nearest Neighbor (KNN) classification is used to decide on the appropriate method for the vessel wall segmentation. As vessels are often located very close to the bone, and the intensities of the vessels and bones are usually quite similar, images showing different kinds of vessel surroundings are treated differently. Based on the KNN classification two segmentation methods are applied:

3a. In case a bone is present close to or in proximity of the vessel, an adaptive learning-based ray-casting algorithm is used for segmentation.

3b. In the other case, where no bone is present close to or in proximity of the vessel, the patch is smoothed first by an edge-preserving filtering algorithm. Then, a morphological active contour without edges (MACWE), which is initialized preliminarily with a circle or ellipse of small radius at the given point, is used for segmentation.

A morphological active contour without edges for image segmentation is described by P. Marquez-Neila, L. Baumela, L. Alvarez, *A morphological approach to curvature-based evolution of curves and surfaces*, in: IEEE Transactions on Pattern Analysis and Machine Intelligence, Vol. 36, No. 1, January 2014, which is incorporated by reference herewith.

This algorithm for vessel segmentation is accurate and robust to input data and shows excellent performance independent of whether or not the vessel is located close to the bone structures.

II. Second Example

A second example relates to an adaptive approach which uses both machine learning for classification of the vessel surrounding first, followed by an accurate segmentation of the vessel wall. Similarly to the first example, a morphological active contour without edges (MACWE), preferably shape-constrained, is applied in cases where the vessel is not located close to bones, and a learning based ray casting algorithm is used otherwise.

It is assumed that a point within the vessel outer wall and a tangential vector to the vessel at the point (or the cross-sectional image of the vessel) are given. To ensure the algorithm runs properly the point should be located inside the vessel lumen.

Image Patch Extraction

An image patch with the center located at the given point is extracted using trilinear interpolation, wherein a value at each position of the patch is interpolated using values at eight direct neighboring voxels of the initial volume image data. As the algorithm does not know in advance which vessel it should expect, the image patch size is preferably large enough to fit any possible human or animal artery cross-section of vessel bifurcation or branching, which are the parts of the vascular system where vessels branch into two smaller vessels.

If the cross-sectional image at the point is given, then this step is preferably skipped.

Patch Data Preprocessing

Preferably, the patch data are standardized first by performing the following steps:

1. The data are rescaled so that the pixels intensity values lie in the range [0; 1].

2. The mean $\mu$ and standard deviation $\sigma$ of intensities for the patch are calculated.

3. Each value $p_i$ is normalized using mean $\mu$, standard deviation $\sigma$ and regularization parameter $\varepsilon$ as follows:

$$\sum_i \frac{p_i - \mu}{\sqrt{\sigma^2 + \varepsilon}}$$

4. The histogram is clipped such that negative values are set to zero and values larger than 1 are set to 1.

In this way, the important bright structures at the patch are enhanced and noise and other inessential structures are darkened. Depending on whether or not the bone structures are present in the patch, the inside of the vessel is either darkened or enhanced.

Patch Classification

Vessels are often located very close to bones, and the intensities of vessels and bones are usually quite similar. Therefore edges between vessels and bones are blurred. A fully automatic active contour based method could diverge and leak out of the vessel eventually. Therefore, images showing different kinds of vessel surroundings are treated differently.

Preferably, a K-Nearest Neighbor (KNN) classification is used to decide on the appropriate strategy or method for vessel wall segmentation. Preferably, the classification comprises two phases, i.e. a training phase, in which a classifier is determined based on a number of training samples, and classification phase, in which an image is classified by using the classifier obtained in the training phase.

In the training phase the following steps for each training sample are performed:

1. Subdividing the patch into nine sub-patches—$I_{00}$, $I_{01}$, ..., $I_{22}$

| $I_{00}$ | $I_{01}$ | $I_{02}$ |
| $I_{10}$ | $I_{11}$ | $I_{12}$ |
| $I_{20}$ | $I_{21}$ | $I_{22}$ |

2. As the image patch is extracted in a way the given point is located preferably close to the center of the vessel lumen, it is assumed that the central sub-patch $I_{11}$ lies partially or fully inside the vessel and can therefore become a "reference" sub-patch.

3. Compute the mean intensities for each sub-patch $\mu_{ij}$

| | | |
|---|---|---|
| $\mu_{00}$ | $\mu_{01}$ | $\mu_{02}$ |
| $\mu_{10}$ | $\mu_{11}$ | $\mu_{12}$ |
| $\mu_{20}$ | $\mu_{21}$ | $\mu_{22}$ |

4. Subtract the mean intensity of the reference sub-patch $I_{11}$ from mean intensities of the other sub-patches:

| | | |
|---|---|---|
| $\mu_{00} - \mu_{11}$ | $\mu_{01} - \mu_{11}$ | $\mu_{02} - \mu_{11}$ |
| $\mu_{10} - \mu_{11}$ | 0 | $\mu_{12} - \mu_{11}$ |
| $\mu_{20} - \mu_{11}$ | $\mu_{21} - \mu 11$ | $\mu_{22} - \mu_{11}$ |

5. From the sub-patch intensity differences an eight-dimensional feature vector is formed:

$$v_k = (\mu_{00} - \mu_{11}, \mu_{01} - \mu_{11}, \ldots, \mu_{22} - \mu_{11})^T$$

6. The KNN classifier is trained with feature vectors for two classes, namely a normal case without bones located next to the vessel, also referred to as "second surrounding class", and a case where the vessel is located next to bones, also referred to as "first surrounding class".

In the classification phase for each new sample repeat the steps 1 to 5 of the training phase are repeated. The KNN classifier is used to decide to which class this patch more probably belongs to.

Learning-Based Ray Casting

In case a bone and/or a high concentration of bone structures is present close to or in proximity of the vessel, i.e. the surrounding of a vessel represented in an image is assigned to the first surrounding class, an adaptive learning-based ray casting algorithm is used for segmentation of the vessel wall.

The algorithm preferably comprises two phases, namely a threshold learning phase and a ray casting phase.

Figure 2:
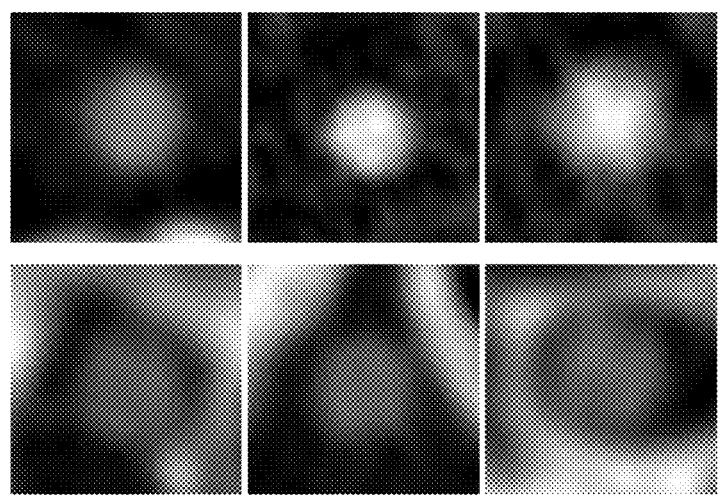
FIG. 2 shows examples of patches without (upper row) and with (lower row) bones or bone structures located close to or in the proximity of the vessel.

Given a set with training samples for both cases, i.e. normal samples with vessels only, and samples with bones located next to the vessels. FIG. 2 shows three examples of image patches without bones in the proximity of the vessel (upper row) and three examples of image patches with bones located close to the vessel (lower row).

At the threshold learning phase for each sample the following steps are performed:

1. Compute an average intensity $\mu_c$ value at the neighborhood of the center of the vessel. Preferably, a 5×5 kernel is used.

2. Compute several relative intensity distances between the average intensity $\mu_c$ and intensities at the pixels inside and outside of the vessel border.

3. Train two Kernel density estimators with relative intensity distances: $K_v$ relating to distances inside the vessel, and $K_{nv}$ relating to distances between $\mu_c$ and pixel intensities outside the vessel borders.

At the ray casting phase for each new patch the following steps are performed:

1. Compute an average intensity $\mu_c$ value at the neighborhood of the given point $p_c$ close to the center of the vessel. Preferably, a 5×5 kernel is used.

2. Set an angle increment $\alpha_n$ and generate rays at all angles from the set $\{0, \alpha_n, 2\alpha_n, \ldots, 360-\alpha_n\}$ 3. For each ray $r_k$ find the closest to the $p_c$ point $p_k^+$ at which the probability of being a vessel is less than the probability of being something else: p(vessel)<p(nonvessel). The distance $d_k$ is added to the radial histogram of distances $H_d$.

4. The rays for which a local extrema has not been found are stored in a list $L_r$. For other rays an average distance $\bar{d}$ is computed.

5. A histogram-based thresholding method is applied to the histogram of distances $H_d$. If a threshold $t_0$ is found, then the distances for all rays from the list $L_r$ are set to the threshold $t_0$. Preferably, the histogram-based thresholding method described by A. G. Shanbhag, *Utilization of information measure as a means of image thresholding*, in: Graphical Models and Image Processing (CVGIP), 56(5), 414-419, 1994, is applied, which is incorporated by reference herewith.

6. Use moving averages method for smoothing the contour.

Morphological Active Contour without Edges

In case no bone and/or only a low concentration of bone structures is present close to or in proximity of the vessel, i.e. the surrounding of a vessel represented in an image is assigned to the second surrounding class, preferably a morphological active contour without edges (MACWE) is used for segmentation of the vessel wall.

By means of active contour without edges (ACWE) objects are detected where boundaries are not necessarily defined by gradient information. For details it is referred to T. F. Chan, B. Y. Sandberg, and L. A. Vese, *Active contours without edges for vector-valued images*, in: Journal of Visual Communication and Image Representation, 11(2):130-141, 2000, which is incorporated by reference herewith.

The active contour without edges (ACWE) functional of a curve C is defined as:

$$F(c_1; c_2; C) = \mu \text{Length}(C) + v \text{Area}(\text{inside}(C)) + \lambda_1 \int_{inside(C)} \|I(x) - c_1\| dxdy + \lambda_2 \int_{outside(C)} \|I(x) - c_2\| dxdy,$$

where $\mu \geq 0$, $v \geq 0$, $\|\|_1$, $\lambda_2 > 0$ are fixed parameters, $c_1$ and $c_2$ are the mean of the values $I(x)$ inside and outside of the contour C.

For determining the contour of an object the following minimization problem is considered:

$$\inf_{c_1, c_2, C} F(c_1, c_2, C)$$

As an initial object for the algorithm a small circle is used with the center at the given centerline or starting point preferably close to the center of the vessel lumen.

The preferably used morphological active contour without edges (MACWE) corresponds to a morphological approximation for the aforementioned minimization problem, which is described by L. Alvarez, L. Baumela, P. Henriquez, and P. Marquez-Neila, *Morphological snakes*, in: Computer Vision and Pattern Recognition (CVPR), 2010 IEEE Conference, pages 2197-2202. IEEE, 2010, which is incorporated by reference herewith. Advantageously, this morphological approximation for the aforementioned minimization problem does not require solving a numerical partial differential equation (PDE) unlike the original model and, therefore, does not suffer from numerical stability problems. Besides, the morphological operator is easier and more straightforward to implement than complicated numerical algorithms.

As a result, the algorithm according to the second example is able to cope with several problems of algorithms known in the prior art and exhibits a number of advantages.

Advantageously, it does not require an edge stopping function, i.e. it is not based on the gradient of the original image. Further, the initial curve can be anywhere inside the desired structure and can have any initial shape, even if the target object looks completely different. Moreover, the initial curve does not necessarily have to be closed. Furthermore, the algorithm is robust to image noise.

In addition, the numerical solution of the partial differential equation (PDE) may be approximated by successive applications of morphological operators. These operators are fast and do not experience stability problems. Besides, morphological operators are easier to implement than multiple numerical algorithms, like linear system solvers etc.

Moreover, the algorithm according to the second example is invariant to initialization surrounding. If it is initialized in a dark area, it will tend to bright structures. Otherwise, it will tend to dark structures.

Last but not least, the algorithm can be easily extended to higher dimensions and uses only few parameters which are easy to tune.

III. Third Example

A third example relates to a cascade classification algorithm for bifurcation detection in images of blood vessels, in particular Computed Tomography Angiography (CTA) scans of blood vessels.

The algorithm preferably analyzes the vessel surrounding by a trained classifier first, followed by an accurate segmentation of the vessel, in particular the vessel outer wall, by a morphological active contour without edges (MACWE), and finally extracts the boundary features of the segmented object and classifies its shape by an approximate K-nearest neighbor classifier.

More specifically, the third example relates to a real-time cascade classification algorithm for bifurcation detection. Preferably, two classifiers are trained for two separate steps of the algorithm. A first classifier is trained to differentiate locations with a high concentration of bone structures next to the vessel, and a second classifier is trained to differentiate bifurcations.

Advantageously, the algorithm does not necessarily require full segmentation of the vessel tree to function properly. Instead it is working with cross-sectional images orthogonal to the vessel. The algorithm can either be a part of a bigger vessel tracking algorithm to classify bifurcation locations on the fly, or be used to post process already existing vessel trees. The algorithm is fast, able to work in real-time and can be integrated into bigger vessel analysis systems. It has been successfully applied on arteries from various parts of the body, like head, neck and legs.

Figure 3:
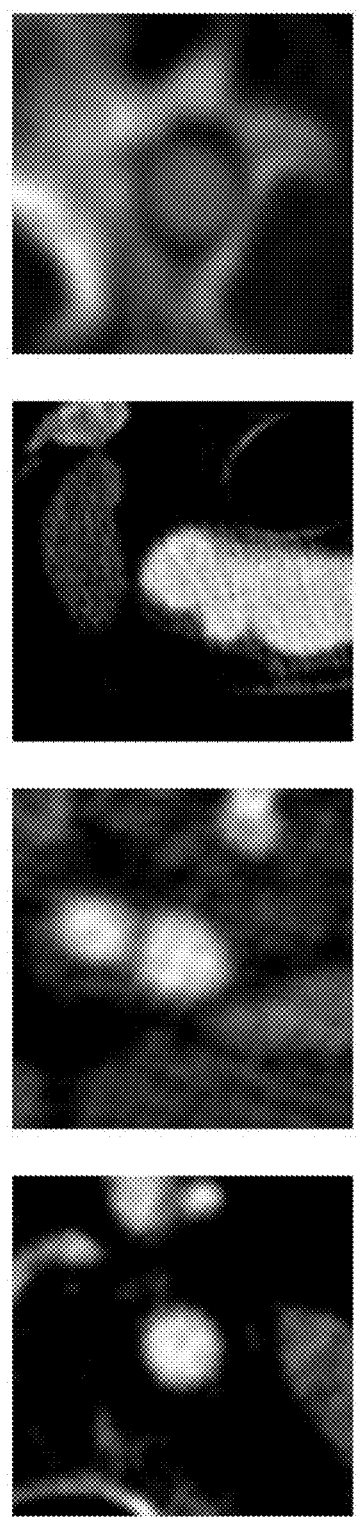
FIG. 3 shows cross-sectional images of (a) a normal vessel, (b) a bifurcation, (c) a double bifurcation, and (d) vessel passing through a bone.

As the appearance of vessels varies greatly in different human body parts it is challenging to define a generic approach able to cope with all possible scenarios. In cross-sectional images vessels usually appear as bright structures on dark surrounding, as exemplarily shown in FIG. 3(a). In FIGS. 3(b) and 3(c) typical cross-sections of bifurcations are shown. In most cases bifurcations look like two smaller vessels merged together. Many arteries such as vertebral, basilar and carotid ones can differ in intensity as they pass through or run right next to bone structures, as exemplarily shown in FIG. 3(d). In those cases intensities of bone structures and vessels are similar and therefore there is no clear border visible between them.

The algorithm according to the third example is based on the notion that there are no important large bifurcations in vessel locations next to bone structures and, therefore, image patches exhibiting bone structures close to or in proximity of a vessel can be excluded in the first step of the algorithm. At the second step, the area within the vessel outer wall is segmented first, and then the shape of the segmented region is classified.

Briefly, on each given candidate position the algorithm comprises the following main steps:
1. Reconstruct a vessel cross-section;
2. Classify whether the vessel is located next to bone structures using combination of features and classifiers;
3. Segment the interior area within vessel outer wall; and
4. Classify whether the segmented shape represents a bifurcation using a set of boundary descriptors and ANN classifier.

These steps will be elucidated in more detail in the following.

Vessel Cross-Section Reconstruction

In order to generate a cross-section of a vessel, a point preferably inside the vessel lumen and a tangential vector at the point are required. If the centerline of a vessel is given, the vector can be easily computed.

Preferably, in order to extract the centerlines and hence the cross-sections of the vessel paths a method described by S. Zambal, J. Hladuvka, A. Kanitsar, and K. Bühler, *Shape and appearance models for automatic coronary artery tracking*, in: Proc. of MICCAI Workshop 3D Segmentation in the Clinic: A Grand Challenge II, 2008, is used, which is incorporated by reference herewith.

Vessel cross-sections are computed then at the centerline points. An image patch $P^i$ with the center located at the given point is extracted using trilinear interpolation, wherein a value at each position of the patch is interpolated using values at eight direct neighboring voxels of the initial volume. As the size of a vessel is not known in advance the algorithm is preferably configured to generate an image patch such that any possible human artery cross-section of a vessel bifurcation would fit into it. For example, the average size of a patch is approximately 10 mm, and the maximal size is up to 40 mm for certain large arteries.

Feature Representation for Intensity-Based Cross-Section Classification

To train the algorithm to differentiate between patches with clearly seen vessels from patches with bone structures, preferably one or more of the following features are evaluated:

Histogram of Oriented Gradients (HOG): The descriptor counts occurrences of gradient information in localized patches of an image, as described by N. DALAL, B. TRIGGS, *Histograms of oriented gradients for human detection*, in: Computer Vision and Pattern Recognition, 2005, CVPR 2005, IEEE Computer Society Conference (June 2005), vol. 1, pp. 886-893, which is incorporated by reference herwith. HOG features are advantageously applied to detect multiple anatomical regions simultaneously. In the context with the algorithm according to the third example, HOG features are preferably used in the first classification stage, because patches showing bone structures exhibit high local gradients in the bone as well as at the bone edges. Hence, they are distinguishable from normal vessel patches, where high gradients occur mainly at the vessel borders.

Haralick Texture Features (HTF): A set of simple texture features based on spatial gray-scale dependencies is applied to the image classification, as described by HARALICK R., SHANMUGAM K., DINSTEIN I., *Texture features for image classification*, IEEE Transactions on Systems, Man, and Cybernetics 3, 6 (1973), which is incorporated by reference herewith. The features may be used in methods for content retrieval from medical images for tissue identification and image classification as well as for automatic diagnosis of lumbar intervertebral discs degeneration. In the original paper of Haralick et al. 14 descriptors were introduced, whereas according to the present algorithm 10 descriptors are used as follows: angular second moment, contrast, correlation, sum of squares (variance), inverse difference moment, sum average, sum variance, sum entropy, difference variance and difference entropy.

Figure 4:
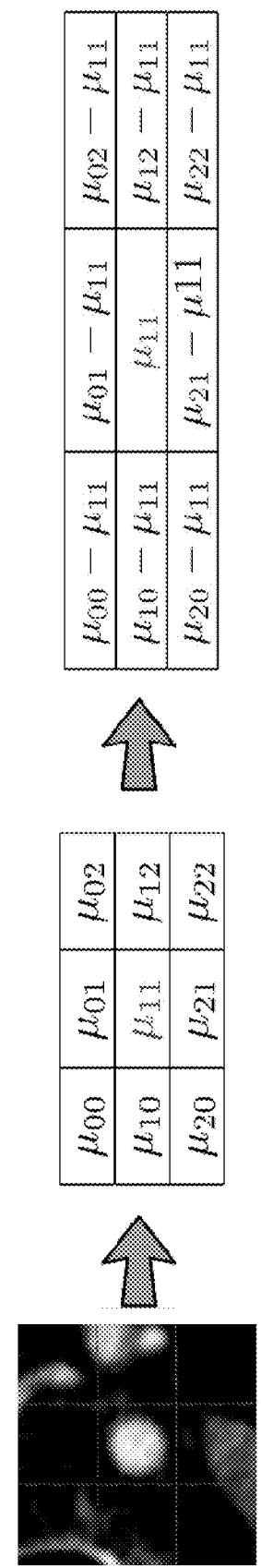
FIG. 4 shows a schematic representation of a feature generation for directional derivatives of pixel intensities (DDPI) descriptors.

Directional Derivatives of Pixel Intensities (DDPI): A simple set of intensity-based features are used. For each patch the following steps are repeated (see also FIG. 4 for illustration):

1. Subdivide the patch $P^i$ into nine sub-patches $P_{jk}^i$ (see FIG. 2) where j, k ∈ [0,2]

2. As the image patch is extracted in a way the given point is located close to the center of the vessel lumen it is assumed that the central sub-patch lies partially or fully inside the vessel and, therefore, becomes a "reference" sub-patch.

3. For each sub-patch $P_{jk}^i$ compute the mean intensity $\mu_{jk}$ of its pixels.

4. Subtract the mean intensity of the reference sub-patch from mean intensities of the other sub-patches.

5. Form an eight-dimensional feature vector as follows:

$$v^i = (\mu_{00} - \mu_{11}, \mu_{01} - \mu_{11}, \ldots, \mu_{22} - \mu_{11})^T.$$

6. Make the feature rotation invariant by sorting the values of each vector $v_i$ in ascending order.

7. Train the classifier with eight-dimensional feature vectors set forth above for two classes, i.e. a normal case ("second surrounding class") without bones located next to the vessel (including cases with bifurcations), and the case when the vessel is passing through or running close to bone structures ("first surrounding class").

Classification Algorithms

For the classification task at least one of the two following supervised learning classification algorithms is used.

An Approximate Nearest Neighbor Method (ANN) Priority Search K-Means algorithm belongs to a class of approximate nearest neighbor algorithms and is extremely efficient especially when either the feature space dimension or the number of training samples is large. The search tree is constructed by separating points at each tree level into M distinct regions using k-means clustering until the number of points in the region is smaller than M. For details regarding this algorithm it is referred to MUJA M., LOWE D., *Scalable nearest neighbor algorithms for high dimensional data*, in: Pattern Analysis and Machine Intelligence, IEEE Transactions on 36, 11 (November 2014), 2227-2240, which is incorporated by reference herewith.

A Support Vector Machine (SVM) algorithm efficiently performs a non-linear classification by constructing a hyperplane which would represent the largest separation between the classes. SVM is particularly efficient when working with HOG features in image processing particularly. For details regarding this algorithm it is referred to CORTES C., VAPNIK V., *Support-vector networks*, in: Machine learning 20, 3 (1995), 273-297, which is incorporated by reference herewith.

Preferably, at the first classification level of the scheme (see main step 2. above) each one of both classifiers, i.e. ANN or SVM, is combined with three different features.

Preferably, in the second classification part of the scheme (see main step 4. above) only the ANN on boundary features is used.

Morphological Active Contour without Edges for Vessel Segmentation

For vessel segmentation, in particular vessel outer wall segmentation, a morphological active contour without edges (MACWE), as described above in connection with the second example, is used.

Feature Representation for Segmented Shape Classification

For classification of the segmented object, i.e. the vessel outer wall, boundary descriptors are used. In order to compute the descriptors the segmentation is outlined first by using morphological operators (dilation followed by subtraction) and then the minimum-bounding rectangle is fitted to the outline using the method described in CHAUDHURI D., SAMAL A., *A simple method for fitting of bounding rectangle to closed regions*, in: Pattern Recogn. 40, 7 (July 2007), 1981-1989, which is incorporated by reference herewith.

The following descriptors are particularly suitable for the present classification task because they are capable of differentiating between circular and elliptic shapes (shapes which vessels and bifurcations normally have) or highly concave shapes which in turn could result from a failed segmentation.

Elongation:

$$\text{Elongation} = \frac{width_{bounding\text{-}box}}{height_{bounding\text{-}box}}$$

Eccentricity:

$$\text{Eccentricity} = \frac{\text{axis } length_{short}}{\text{axis } length_{long}}$$

Convexity:

$$\text{Convexity} = \frac{\text{convex perimeter}}{\text{perimeter}}$$

Solidity:

$$\text{Solidity} = \frac{\text{area}}{\text{convex area}}$$

Standard Deviation of Radial Distances:

$$S_d = \sqrt{\frac{1}{N-1} \sum_{i=1}^{N} (d_i - \bar{d})^2},$$

where i ∈ [1,N]; $d_i$ is the radial distance, i.e. the distance from the center of mass of the contour points to the perimeter point $(x_i, y_i)$.

Figure 6:
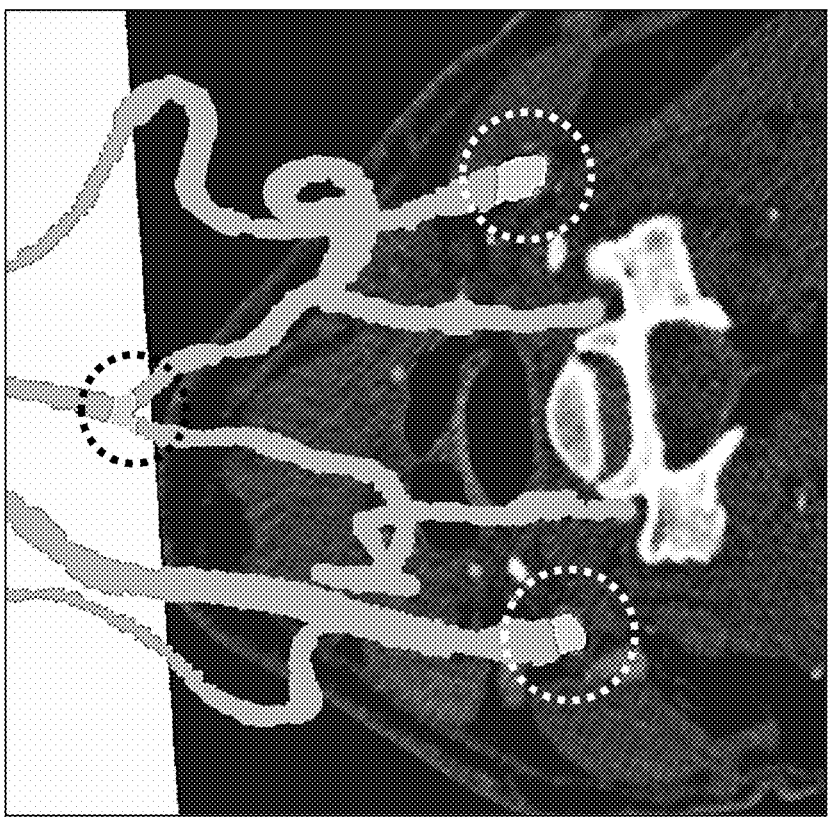
FIG. 6 shows a segmented vessel tree and bifurcation locations obtained in a head and neck study.
Figure 5:
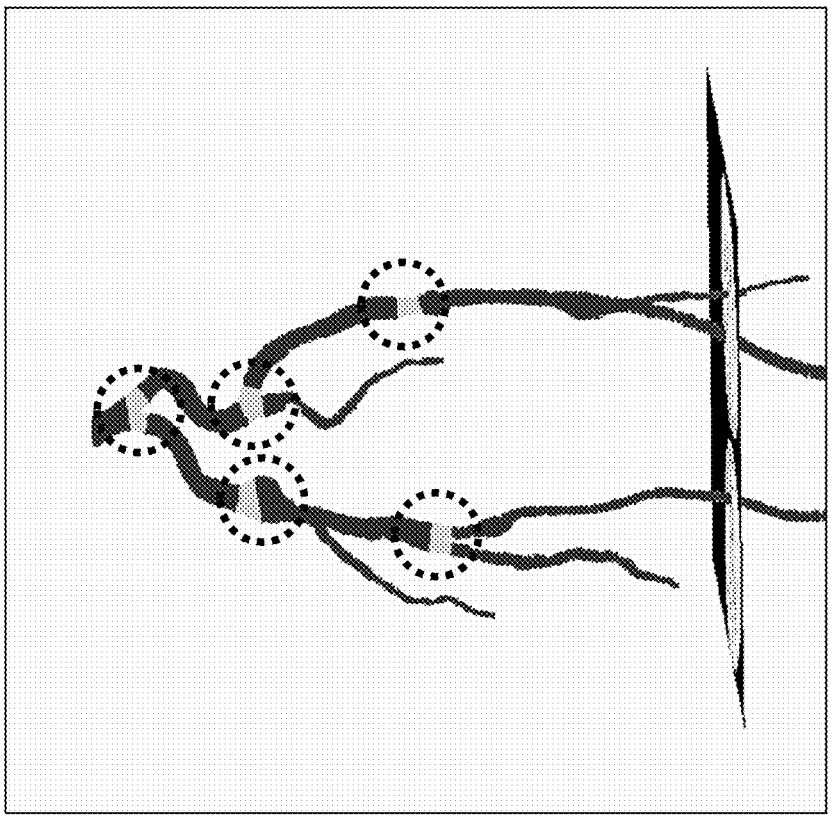
FIG. 5 shows a segmented vessel tree and bifurcation locations obtained in a leg study.

FIG. 5 shows an example of a segmented vessel tree and bifurcation locations obtained in a leg study with the algorithm according to the third example. FIG. 6 shows an example of a segmented vessel tree and bifurcation locations obtained in a head and neck study with the algorithm according to the third example. For the sake of clarity, the bifurcation locations are additionally marked with dotted circles.

In summary, the two-level algorithm according to the third example allows for reliable artery bifurcation detection in different parts of a human body in CTA images. Advantageously, the algorithm is straightforward to implement because classic and simple features are used for classification and an easy-to-tune algorithm is used for segmentation of the vessel outer wall and further classification of the segmented shape. As the algorithm does not use any CTA-specific information, it can be easily adopted to blood vessel images from other imaging modalities, like magnetic resonance angiography (MRA) images. Last but not least, timing measures results show that the algorithm is also suitable for bigger real-time vessel analysis systems.

The invention claimed is:

1. A method for segmentation and/or shape detection of blood vessels in medical images, the method comprising the steps of:
    classifying a surrounding of a vessel in a medical image by applying a first classifier to the medical image, the surrounding of the vessel being assigned to one of at least two surrounding classes; and
    segmenting the vessel depending on the surrounding class to which the surrounding of the vessel has been assigned; wherein
    a method used to perform the step of segmenting is selected from at least two predefined segmentation methods based on the surrounding class of the vessel assigned in the step of classifying;
    the at least two surrounding classes are different in a concentration of bone structures in proximity of the vessel;
    the at least two surrounding classes include a first surrounding class and a second surrounding class, a concentration of bone structures in proximity of the vessel in the first surrounding class is higher than a concentration of bone structures in proximity of the vessel in the second surrounding class; and
    if the surrounding of the vessel in the medical image is assigned to the first surrounding class, the segmentation of the vessel includes applying a learning-based ray casting algorithm to the medical image.

2. A method for segmentation and/or shape detection of blood vessels in medical images, the method comprising the steps of:
    classifying a surrounding of a vessel in a medical image by applying a first classifier to the medical image, the surrounding of the vessel being assigned to one of at least two surrounding classes; and
    segmenting the vessel depending on the surrounding class to which the surrounding of the vessel has been assigned; wherein
    a method used to perform the step of segmenting is selected from at least two predefined segmentation methods based on the surrounding class of the vessel assigned in the step of classifying;
    the at least two surrounding classes are different in a concentration of bone structures in proximity of the vessel;
    the at least two surrounding classes include a first surrounding class and a second surrounding class, a concentration of bone structures in proximity of the vessel in the first surrounding class is higher than a concentration of bone structures in proximity of the vessel in the second surrounding class; and
    if the surrounding of the vessel in the medical image is assigned to the second surrounding class, the step of segmenting includes applying an algorithm based on a morphological active contour without edges (MACWE) to the medical image.

3. A method for segmentation and/or shape detection of blood vessels in medical images, the method comprising the steps of:
    classifying a surrounding of a vessel in a medical image by applying a first classifier to the medical image, the surrounding of the vessel being assigned to one of at least two surrounding classes; and
    segmenting the vessel depending on the surrounding class to which the surrounding of the vessel has been assigned; wherein
    a method used to perform the step of segmenting is selected from at least two predefined segmentation methods based on the surrounding class of the vessel assigned in the step of classifying;
    the first classifier is obtained by training a classifier with feature vectors for the at least two surrounding classes; and
    the first classifier is a k-nearest neighbor (KNN) classifier that assigns the surrounding of the vessel to a surrounding class most common among its k nearest neighbors, and k is a positive integer.

4. A method for segmentation and/or shape detection of blood vessels in medical images, the method comprising the steps of:
    classifying a surrounding of a vessel in a medical image by applying a first classifier to the medical image, the surrounding of the vessel being assigned to one of at least two surrounding classes; and
    segmenting the vessel depending on the surrounding class to which the surrounding of the vessel has been assigned; wherein
    a method used to perform the step of segmenting is selected from at least two predefined segmentation methods based on the surrounding class of the vessel assigned in the step of classifying;
    the at least two surrounding classes are different in a concentration of bone structures in proximity of the vessel;
    the first classifier is obtained by training a classifier with feature vectors for the at least two surrounding classes; and
    the first classifier is a k-nearest neighbor (KNN) classifier that assigns the surrounding of the vessel to a surrounding class most common among its k nearest neighbors, and k is a positive integer.

5. A method for segmentation and/or shape detection of blood vessels in medical images, the method comprising the steps of:
    classifying a surrounding of a vessel in a medical image by applying a first classifier to the medical image, the surrounding of the vessel being assigned to one of at least two surrounding classes; and
    segmenting the vessel depending on the surrounding class to which the surrounding of the vessel has been assigned; wherein
    a method used to perform the step of segmenting is selected from at least two predefined segmentation methods based on the surrounding class of the vessel assigned in the step of classifying;
    the at least two surrounding classes are different in a concentration of bone structures in proximity of the vessel;
    the at least two surrounding classes include a first surrounding class and a second surrounding class, a concentration of bone structures in proximity of the vessel in the first surrounding class is higher than a concentration of bone structures in proximity of the vessel in the second surrounding class;

the first classifier is obtained by training a classifier with feature vectors for the at least two surrounding classes; and the first classifier is a k-nearest neighbor (KNN) classifier that assigns the surrounding of the vessel to a surrounding class most common among its k nearest neighbors, and k is a positive integer.

6. A method for segmentation and/or shape detection of blood vessels in medical images, the method comprising the steps of:

classifying a surrounding of a vessel in a medical image by applying a first classifier to the medical image, the surrounding of the vessel being assigned to one of at least two surrounding classes; and segmenting the vessel depending on the surrounding class to which the surrounding of the vessel has been assigned; wherein a method used to perform the step of segmenting is selected from at least two predefined segmentation methods based on the surrounding class of the vessel assigned in the step of classifying; and the method further comprises the step of:

classifying a shape of at least one section of a segmented vessel wall of the vessel by applying a second classifier to the segmented vessel wall, such that the at least one section of the segmented vessel wall is assigned to one of two shape classes.

7. The method according to claim 6, wherein the two shape classes include a first shape class relating to a vessel shape exhibiting a bifurcation.

8. The method according to claim 7, wherein the second classifier is obtained by training a classifier with one or more boundary descriptors for the two shape classes.

9. The method according to claim 8, wherein the one or more boundary descriptors relate to at least one of an elongation, an eccentricity, a convexity, a solidity, and a standard deviation of radial distances of the segmented vessel wall.

10. The method according to claim 8, wherein the second classifier is based on an approximate nearest neighbor (ANN) algorithm and a support vector machine (SVM) algorithm.

11. The method according to claim 6, wherein the second classifier is obtained by training a classifier with one or more boundary descriptors for the two shape classes.

12. The method according to claim 11, wherein the one or more boundary descriptors relate to at least one of an elongation, an eccentricity, a convexity, a solidity, and a standard deviation of radial distances of the segmented vessel wall.

13. The method according to claim 11, wherein the second classifier is based on an approximate nearest neighbor (ANN) algorithm and a support vector machine (SVM) algorithm.

14. A method for segmentation and/or shape detection of blood vessels in medical images, the method comprising the steps of:

classifying a surrounding of a vessel in a medical image by applying a first classifier to the medical image, the surrounding of the vessel being assigned to one of at least two surrounding classes; and segmenting the vessel depending on the surrounding class to which the surrounding of the vessel has been assigned; wherein a method used to perform the step of segmenting is selected from at least two predefined segmentation methods based on the surrounding class of the vessel assigned in the step of classifying; and the at least two surrounding classes are different in a concentration of bone structures in proximity of the vessel; and the method further comprises the step of:

classifying a shape of at least one section of a segmented vessel wall of the vessel by applying a second classifier to the segmented vessel wall, such that the at least one section of the segmented vessel wall is assigned to one of two shape classes.

15. The method according to claim 14, wherein the two shape classes include a first shape class relating to a vessel shape exhibiting a bifurcation.

16. A method for segmentation and/or shape detection of blood vessels in medical images, the method comprising the steps of:

classifying a surrounding of a vessel in a medical image by applying a first classifier to the medical image, the surrounding of the vessel being assigned to one of at least two surrounding classes; and segmenting the vessel depending on the surrounding class to which the surrounding of the vessel has been assigned; wherein a method used to perform the step of segmenting is selected from at least two predefined segmentation methods based on the surrounding class of the vessel assigned in the step of classifying;

the at least two surrounding classes are different in a concentration of bone structures in proximity of the vessel;

the at least two surrounding classes include a first surrounding class and a second surrounding class, a concentration of bone structures in proximity of the vessel in the first surrounding class is higher than a concentration of bone structures in proximity of the vessel in the second surrounding class; and the method further comprises the step of:

classifying a shape of at least one section of a segmented vessel wall of the vessel by applying a second classifier to the segmented vessel wall, such that the at least one section of the segmented vessel wall is assigned to one of two shape classes.

17. The method according to claim 16, wherein the two shape classes include a first shape class relating to a vessel shape exhibiting a bifurcation.

* * * * *